(12) United States Patent
Blank

(10) Patent No.: US 10,015,069 B1
(45) Date of Patent: Jul. 3, 2018

(54) SYSTEM AND APPARATUS FOR MONITORING NETWORKS AND QUALITY-OF-SERVICE ELEMENTS WITHIN NETWORKS

(71) Applicant: Komodo Systems Inc., Murray, UT (US)

(72) Inventor: Jeffrey T. Blank, Frostburg, MD (US)

(73) Assignee: Komodo Systems Inc., Murray, UT (US)

( * ) Notice: Subject to any disclaimer, the term of this patent is extended or adjusted under 35 U.S.C. 154(b) by 573 days.

(21) Appl. No.: 14/209,195

(22) Filed: Mar. 13, 2014

Related U.S. Application Data

(60) Provisional application No. 61/785,142, filed on Mar. 14, 2013.

(51) Int. Cl.
*H04L 12/26* (2006.01)

(52) U.S. Cl.
CPC .................... *H04L 43/12* (2013.01)

(58) Field of Classification Search
CPC ... H04L 43/08; H04L 12/2602; H04L 41/147; H04L 43/00; H04L 43/0811; H04L 43/0852; H04L 43/0864; H04L 43/10; H04L 43/16; H04W 24/00; H04W 24/10; H04W 4/06; H04W 4/08; H04W 52/0216; H04W 88/08; G06F 1/3287; G06F 9/4418
See application file for complete search history.

(56) References Cited

U.S. PATENT DOCUMENTS

| | | | |
|---|---|---|---|
| 8,654,660 B2 * | 2/2014 | Ketonen | H04L 12/2602 370/252 |
| 2008/0104224 A1 * | 5/2008 | Litofsky | G06F 17/3089 709/224 |
| 2010/0177708 A1 * | 7/2010 | Pandey | H04W 74/0883 370/329 |
| 2012/0290724 A1 * | 11/2012 | Noro | G06F 17/30887 709/225 |
| 2012/0307662 A1 * | 12/2012 | Puolakka | H04W 24/02 370/252 |

* cited by examiner

*Primary Examiner* — Arvin Eskandarnia
(74) *Attorney, Agent, or Firm* — ColterJennings

(57) ABSTRACT

A system and apparatus for monitoring networks and quality-of-service elements within networks. Probes placed at strategic locations throughout the network activate at predetermined intervals or upon predetermined events, conduct tests emulating actual user experience, and report the results of the tests to a controller. The data collected by the controller is used to maintain the integrity of the network and to evaluate the user experience within the network.

20 Claims, 14 Drawing Sheets

FIGURE 9

SYSTEM AND APPARATUS FOR MONITORING NETWORKS AND QUALITY-OF-SERVICE ELEMENTS WITHIN NETWORKS

RELATED APPLICATION DATA

This application claims the benefit of the filing date of U.S. Provisional Patent Application Ser. No. 61/785,142 titled "System and Apparatus for Monitoring Networks and Quality-of-Service Elements within Networks" filed on Mar. 14, 2013, which provisional application is hereby incorporated by reference in its entirety.

BACKGROUND

This invention relates to telecommunications systems and data networks. Telecommunications services have generally lacked external continuous testing apparatus to perform and analyze leading and lagging performance indicators from an end user perspective. Methodologies have been introduced by manufacturers but lack and kind of third party verification of service level agreements and user experience.

Throughout the telecommunication industry, users struggle to rely on technology with little or no service level verification. Systems are installed and relied on to a greater and greater degree and still lack advanced external diagnostic devices to ensure trouble free—error free operation.

Existing manufacturer solutions look at the system from the perspective on the equipment and not from the perspective of the user. This creates a disparity between the user experience and the actual operation of the network. This disparity leads technology operators to a false sense of satisfaction with the technology's performance and unwarranted reliance.

In addition, managing these solutions without an objective user perspective can greatly increase costs and decrease user satisfaction with the solution. Operators are forced to rely on user complaints. Operators are then required to respond reactively to problems based on unreliable user feedback instead of engaging in proactive management based on objective continuous testing.

Managing hard-wired and wireless networks can also be a difficult task. This is true in remote locations, where various islands of connectivity may have weak or strong signals at any given time. Even communicating with hardware or software based appliances for management of such connectivity is often a difficult task, increasing the risk a particular area may be left without connectivity for a prolonged period of time due. This down time may occur due to lack of automated management and monitoring capability of the fact that the loss of connectivity itself inhibits the ability to detect and manage the cause of the disruption.

As noted above, even in urban areas, increased reliance and larger numbers of users on public and private Wi-Fi access points and cellular network digital capabilities, has increased the incidence of critical communication failures due to the fact that users have come to expect the same reliability more typical of a wired network. When failures occur, diagnosis of the point or points of failure is often delayed.

In an environment where both individuals and business entities increasingly rely on internet connectivity for personal and business communications, including commerce, banking, task management and calendaring, the ability to monitor connectivity and make corrections remotely, or dispatch personnel immediately to take corrective action, has become critical. In the area of business connectivity, providers of internet transport, ISPs, software-as-a-service (SaaS) providers, and cloud service providers often enter into Service Level Agreements (SLAs) which guarantee a certain percentage of up-time and specify the nature and timing of corrective actions to be taken. These types of agreements may not take into account that certain users are more isolated or more dependent on wireless technologies than others.

The need for reliable measurement and monitoring of wireless data communications has become particularly evident as wireless data communications have come to be used for continuous data streaming. Audio streaming has become a common method of receiving music and spoken word broadcasts via cellular and Wi-fi enabled devices. In particular video streaming consumes the largest percentage of total bandwidth for many users, and has become a significant service that data users depend on. According to a recent study, delivering a poor viewer experience cost global content brands about $2.16 billion in revenue in 2012, and the report notes that "without a shift to higher quality, content brands will miss out on an additional $20 billion through 2017."

Based on 22.6 billion worldwide video streams analyzed throughout 2012, One service determined that about 60 percent of all video streams experienced quality degradation, including 40 percent that were impacted by low resolution picture because of low bitrates, 20.6 percent impacted by buffering and 19.5 percent impacted by slow startup.

Consumers of video streaming clearly noticed these failures. Research showed that in 2011, a one percent (1%) increase in the amount of time spent buffering during VOD (video-on-demand) usage led to three minutes less of viewing time. As VOD becomes even more ubiquitous, the situation further deteriorates. As of the present that same one percent of buffering time leads to an eight minute loss.

Online video providers know that consumers have low tolerance for problems with playback. Viewers are becoming increasingly less tolerant of a poor viewing experience when streaming online content while the content providers have little to no visibility into how frequently this intolerance occurs. As noted above, providers have typically viewed their networks in terms of equipment functionality and have not been able to measure or monitor the users' experience directly.

In addition to reliability and quality of service of raw communications data, the same issues have been manifest in what is generally referred to as the "internet of things" which maps physical entities onto their virtual representations. A prime example is the communication grid of both data and hardware in a hospital or other medical environment where many interoperable systems must communicate via wireless or wired networks and be accessed via smart devices from mobile or remote locations.

Another recent example that has received a great deal of publicity is the poor state of internet communications in the hospitality industry, notably poor Wi-Fi service in hotels and motels. Finally, there is a similar need for quality-of-service monitoring in the electrical power/smart grid arena where the status of power distribution is monitored via wired or wireless communications to ensure reliability of service, detect impending or current problems in the system, and secure the most rapid response for remedial actions.

The present system and apparatus address the current shortcoming in an economical way that includes all providers and users in a sophisticated monitoring and remediation system for data connectivity and represents a significant benefit both to the provider and consumer of internet services.

SUMMARY

The system and apparatus comprises one or more stand-alone physical units or "probes" also referred to herein as "pucks" (based on physical similarity of one embodiment to a hockey puck) capable of bi-directional communication capabilities. With the ability to receive on all standard wired and wireless communications bands and modes, the device is able to verify that communications are active and uninterrupted and that the SLA (service level agreement) requirements for each specific device or geography are being met. The device can measure the quality of the signal for signal strength, data throughput, data security, data integrity, connectivity, IP allocation, and other characteristics typical of RF signals and data communication streams.

The probe is software controlled using internal software and external controller software. In one embodiment the software operates one of the freely available Linux distributions. For internal use within the probe, extremely small footprint Linux distributions designed for embedded systems are freely available, including the Linux kernel and device drivers for all physical devices embodied in the probe. Recently developed miniature single-board computers such as the Raspberry PI and Arduino units, coupled with open source or commercial software are also suitable for provision of the probes' internal hardware and software elements.

Using digital wide-band signal processing techniques and SDR (software defined radio) software, a miniature receiver or multiple discrete receivers are configured to monitor all standard Wi-Fi frequencies, cellular bands, and GPS signals. SDR programming allows the probe to be reconfigured for additional bands and communication modes that may be developed in the future.

The physical probe unit may be extremely compact and sealed to be weather resistant for remote mounting in any location. Different configurations may be configured for indoor or outdoor use, the signals to be monitored, radius of the area to be covered, and power sources available.

Communication of information gathered by the probes may be communicated directly to a network or cloud based data facility for processing, analysis, notification, and dispatch of remedial measures. In areas where direct communication is not feasible, a mobile unit may be routed to approach any number of remote probes to activate their reporting systems and collect relevant information. For example, a truck equipped with the appropriate communications equipment may check upon hundreds of devices within a short time, merely by following a pre-determined route that takes it within the communications radius of the devices, activating them and downloading current or stored information without stopping or physically engaging the probes.

BRIEF DESCRIPTION OF THE DRAWINGS

Illustrative embodiments are described in detail below with reference to the attached drawing figures, which are incorporated by reference herein and wherein:

FIG. 9 depicts the top-level of the software controller in a GUI interface;

FIG. 13 depicts a menu of test selections for network sniffing; and.

DETAILED DESCRIPTION OF THE DRAWINGS

The system and apparatus comprises one or more independent probes that monitor communications and a distributed or central monitoring and analysis system and console. Using the monitoring information gathered from the probes and the central console, automated or manual actions may be taken to test or correct the functionality and reliability of the communications being monitored. Tests may be configured to precisely emulate a wide variety of user experiences providing analysis from a real-world user's point of view rather than a mere functional analysis of hardware and software components. Tests may be implemented at predetermined intervals or upon the occurrence of one or more triggering events.

One or more independent probes are installed a predetermined locations, each probe being capable of unidirectional (e.g. GPS) and bi-directional communication capabilities using predetermined bands including those used for WiFi and cellular telephone communications. The probes monitor the presence, strength, and quality of signals on the desired communications bands and can communicate the results of such monitoring in (1) real-time; (2) upon internal activation based on internal triggering events or time intervals; (3) upon external triggering events or upload requests; or (4) via a store-and-forward system where recorded data is saved for later upload when connectivity is established (e.g. from a device on moving vehicle).

The probe element of the system and apparatus can be configured to any convenient size and shape. In one embodiment, all elements of the probe may be contained in a weather-proof housing the approximate size and shape of a standard hockey puck (and thus called the "puck" for short). This configuration may include a central hole allowing the unit to be mounted conveniently on its flat side, or fastened to a vertical or horizontal surface via a bolt or screw through the central hole.

Figure 1:
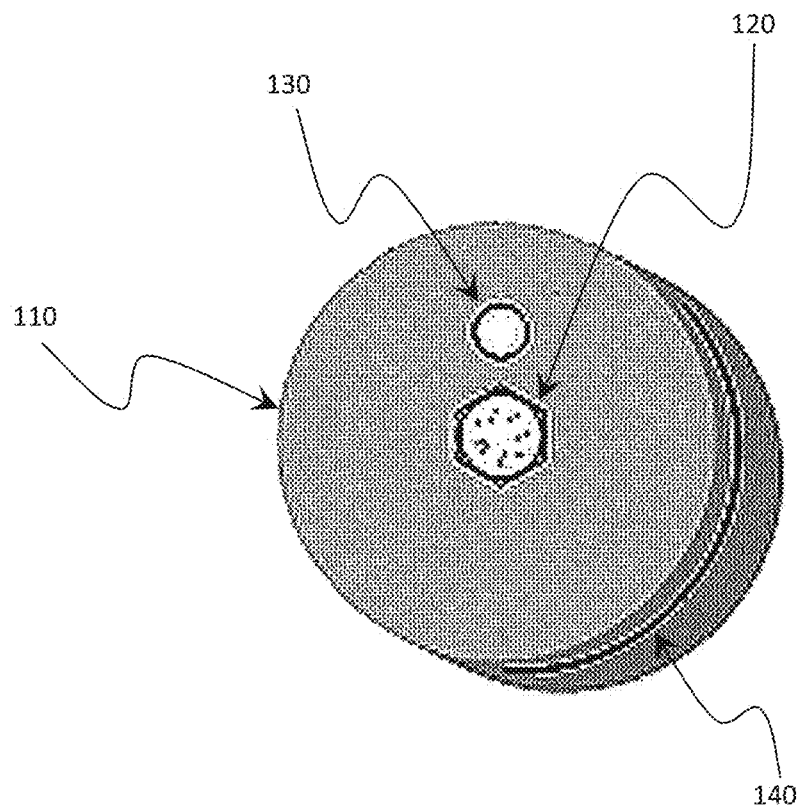
FIG. 1 depicts an embodiment of the probe housing in the "puck" format.

FIG. 1 represents one embodiment of the probe configured in the approximate size and shape of a hockey puck, having an outside diameter of approximately four (4) inches. The housing 110 is comprised of a hard material that is both weather and shock resistant, shielding internal components from moisture and having all openings for external connections appropriately sealed. A central hole passing through the device allows convenient mounting via a bolt 120. A three-color LED is mounted on the visible surface of the probe where multiple colors; typically green, yellow, and red may be turned on or off by the internal control software or an external signal. The color or state of the LED, including a solid or flashing state or the rate of flash, may be pre-configured to indicate the condition of the unit and can be visible from a remote location using binoculars or a portable telescope in the case of a probe mounted in an elevated or other location that is not readily accessible.

For example, probes may be readily installed on or in the vicinity of cellular telephony towers and checked from below by viewing the status LEDs or by triggering tests that manifest themselves via the LEDs. Thus, direct access to the probe for replacement or maintenance will be necessary only when the necessity and nature of the maintenance has been determined remotely.

As the probe is designed to monitor multiple frequencies and bands different antenna elements, designed for each band, are required. These may be internal or external with the material of the probe being transparent to radio waves of the desired frequencies. These antennas are sometimes embedded directly in miniaturized radios incorporated into the probe, such as in miniaturized GPS receivers, cellular telephone devices, and Wi-Fi devices. For other wavelengths or to enhance gain, one or more external antennas 140 may be mounted on the external surface of the probe, either on a flat or curved surface of the probe housing. These may be readily added in the form of simple wire or foil elements of the appropriate length to match the desired radio wavelength. One or more sealed lead-in wires, which may also serve as antenna elements, connect the externally positioned antenna elements to the internal electronic components.

Figure 2:
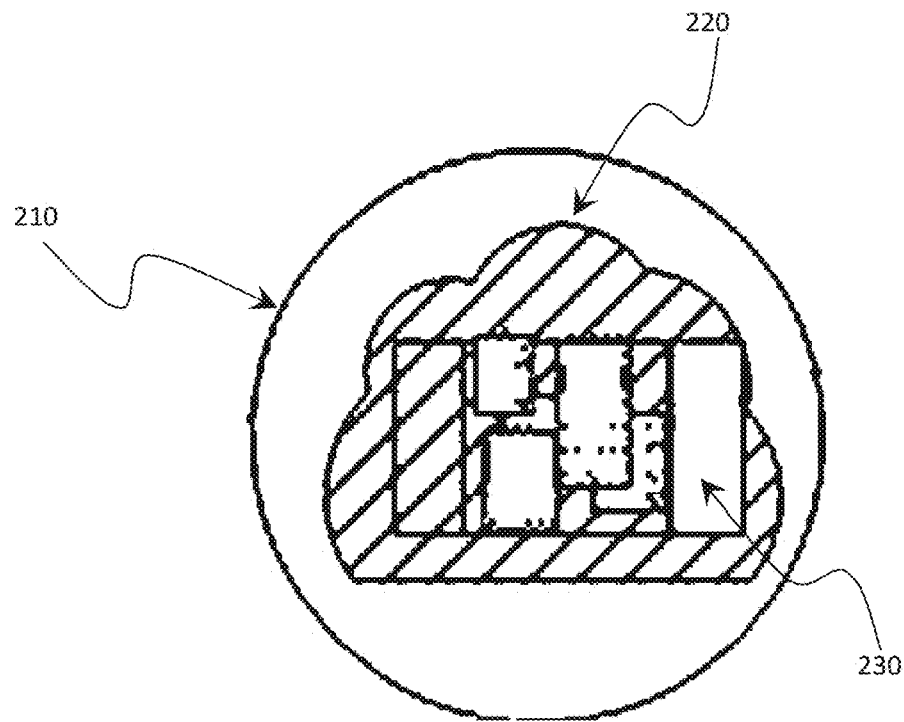
FIG. 2 depicts a cutaway view of one embodiment of the probe housing.

The housing of the probe may be of a sold molded substance that is weather resistant, and capable of having a molded or milled internal cavity to house the circuit board, battery, and other internal components. FIG. 2 shows the "puck" shaped housing 210 with an internal cutout that consists of both straight and rounded areas 220 that can be readily molded or milled so as to allow mounting of the internal control board 230. Multiple configurations of the internal components can be readily accommodated in the molding or milling process.

Another embodiment, more suited for indoor use, would include external power input to replace or supplement battery power, and wired communication capability over a traditional network via a standard network port, such as an Ethernet port. One or more antennas, designed for different wireless frequencies may be internally mounted within the housing or, alternatively, via an external antenna port such as those typically found on Wi-Fi switches, routers, and access points. If probes are to be mounted in areas exposed to sufficient sunlight, power for direct operation and recharging of internal batteries may be supplied by photovoltaic cells mounted directly on the surface of the probe, or positioned externally and connected to the probe via a standard plug and jack set.

With the ability to receive on all standard wired and wireless communications bands and modes, the device is able to verify that communications are active and uninterrupted and that the SLA (service level agreement) requirements for each specific device or geography are being met. The device can perform any number of pre-configured tests that measure the quality of the signal for signal strength, data throughput, data security, data integrity, connectivity, IP allocation, and other characteristics typical of RF signals and data communication streams.

The probe is software controlled using internal software and external controller software. In one embodiment the software operates one of the freely available Linux distributions that are designed for miniature single-board computers. For internal use within the probe, extremely small footprint Linux distributions designed for embedded systems are freely available, including the Linux kernel and device drivers for all physical devices embodied in the probe. Many Linux single board-computers come pre-configured with Ethernet, Wi-Fi, and USB communications, simplifying hardware and software development and providing many optional sources and techniques for achieving the required functionality.

Using digital wide-band signal processing techniques and SDR (software defined radio) software, a miniature receiver or multiple discrete receivers are configured to monitor all standard Wi-Fi frequencies, cellular bands, and GPS signals. SDR programming allows the probe to be reconfigured for additional bands and communication modes that may be developed in the future. Open source and commercial software are readily available for all standard analog and digital forms of modulation and for decoding standard modes.

Embedded software controls operation of the probe device, which software may be readily installed on the embedded Linux operating system and stored in non-volatile memory or loaded into volatile memory for operation. The software includes the ability to maintain the probe in a dormant state, thus conserving power, until it is activated to provide the desired measuring and monitoring tests and services. Activation can occur at predetermined intervals, upon detection of an external event, or upon receipt of a signal requesting the services. The device can then monitor signals on one or more preselected bands continuously, for a predetermined period of time, or at intervals, then report the results of the test wirelessly over one or more bands on which it has transmission capability, or via a wired data connection, if available. The device can then become dormant once again until the next scheduled or ad hoc instruction awakens it for renewed testing. The probe device may perform self-diagnostic tests and communicate the results of such tests proactively, such as low battery or memory errors, allowing repair or replacement of the probe before significant failures occur.

Powered by modern battery technology, or being continuously recharged or powered via an adaptor or other means, such as photovoltaic cells or power-over-Ethernet technology, the device would be able to function indefinitely in continuous power environment or for a period of up to several years between battery replacements in a remote location where only batter power is available. The internal components, described below, are readily susceptible to miniature modular construction allowing the device to be produced in quantity and for a price that would allow wide deployment without significantly affecting overall network maintenance costs.

For example, in office buildings or parks, multiple modules could readily be installed with minimally intrusive methods by simply placing the "puck" devices in various locations where wireless services are used regularly. With periodic or on-demand monitoring, the devices can regularly check on the strength and throughput of various access points and wireless devices throughout the facility, allowing failures, intrusions, and even potential failures to be pinpointed to specific devices immediately. Remedial action can then be taken without the need for complex testing over the entire geography or network topology of the system.

The data communications capabilities native to the network provide the means to carry data about the hardware, software, signal quality, and in-progress communications to a central management console. A central database stores information automatically forwarded by components of the system. Using database and network standard protocols, such as the SQL database language and an SNMP (simple network management protocol) based system, information from the system may be translated into numerical or graphical that can be monitored by network management professionals. The management software may also employ triggers and alerts to provide pro-active warnings of system failures, defects, or development symptoms. The management console may be configured to automatically commence remedial procedures or send messages via email, fax, land-line telephony, cellular telephony, or radio to alert system managers.

Management utilities monitor critical elements of the total network system. These include signal strength, modulation levels, traffic patterns, and error rates. Physical parameters for which metering devices are included in various hardware components either internally or externally and communicating with the probe via network or wireless communication. There environmental factors are also monitored, including temperature, humidity, airflow, power consumption, and physical intrusion or modification. Data communications are also monitored to verify that security measures are operating as expected and to detect any attempts at remote intrusion or improper use within the system.

A key feature of the system and apparatus is the inclusion of a User Experience Scripting Language that facilitates access to and obtaining data from network sources that emulate the actual user experience. Simple physical tests of connectivity or operability do not readily detect whether the functions required for user interaction with the network are fully operable. The ability to create and execute tests in the form of tasks and task lists that can be executed via the system's probes allows real-world use and functionality to be monitored and evaluated in a manner not currently implemented in network management tools The resulting infrastructure is one of many for which management tools are very useful. To this end, the largely autonomous probes may be located at specific, unique locations at or near one of more of the nodes. As described, each probe has its own power supply or access to power. Each probe communicates with the centralized management console or controller, through wireless or hard-wired mechanisms. These nodes may also be used in other network environments, as they are designed to assist in monitoring a wide variety of nodes or network access points. Redundant communication means allow the failure of one mode of communication to be reported via another. For example, failure of Wi-Fi communications may be reported by a wired Ethernet connection, or vice versa.

The probes perform tests on the nearby nodes and access points. Typically, one probe monitors multiple access points or different devices on different frequencies. A single probe could monitor Wi-Fi communications on multiple bands as well as cellular signals covering all bands in use in that geography, as well as GPS reception. For example, the probe could simultaneously monitor GSM, LTE, 4G, 3G, and WiMax communication frequencies and protocols to determine activity, signal strength, and other characteristics. The management console may activate a probe, or the probe may be programmed to automatically activate at predetermined intervals or on the detection of a predetermined condition or event.

When activated, the probe conducts tests on the network at that location and node. These tests may involve a number of critical operating parameters, such as DHCP testing, DNS testing, Security, IP reachability testing, bandwidth testing, SNMP testing, routing testing, or wireless coverage testing. The probes may seek out viewable access points from that location, and determine what communications channels are being used by those access points. The probes may conduct security testing, such as media sniffing for unsafe data sequences. The probes may test their own power status (including battery level, status, and charge or external power condition), software version, MD5 checksum configuration, online configuration, and GPS information. The results of these tests may then be passed back to the management console using the communication system for that probe. The testing of GPS coordinates allows a probe to report any change in location, thus tracking either deliberate repositioning or theft of the devices.

Figure 3:
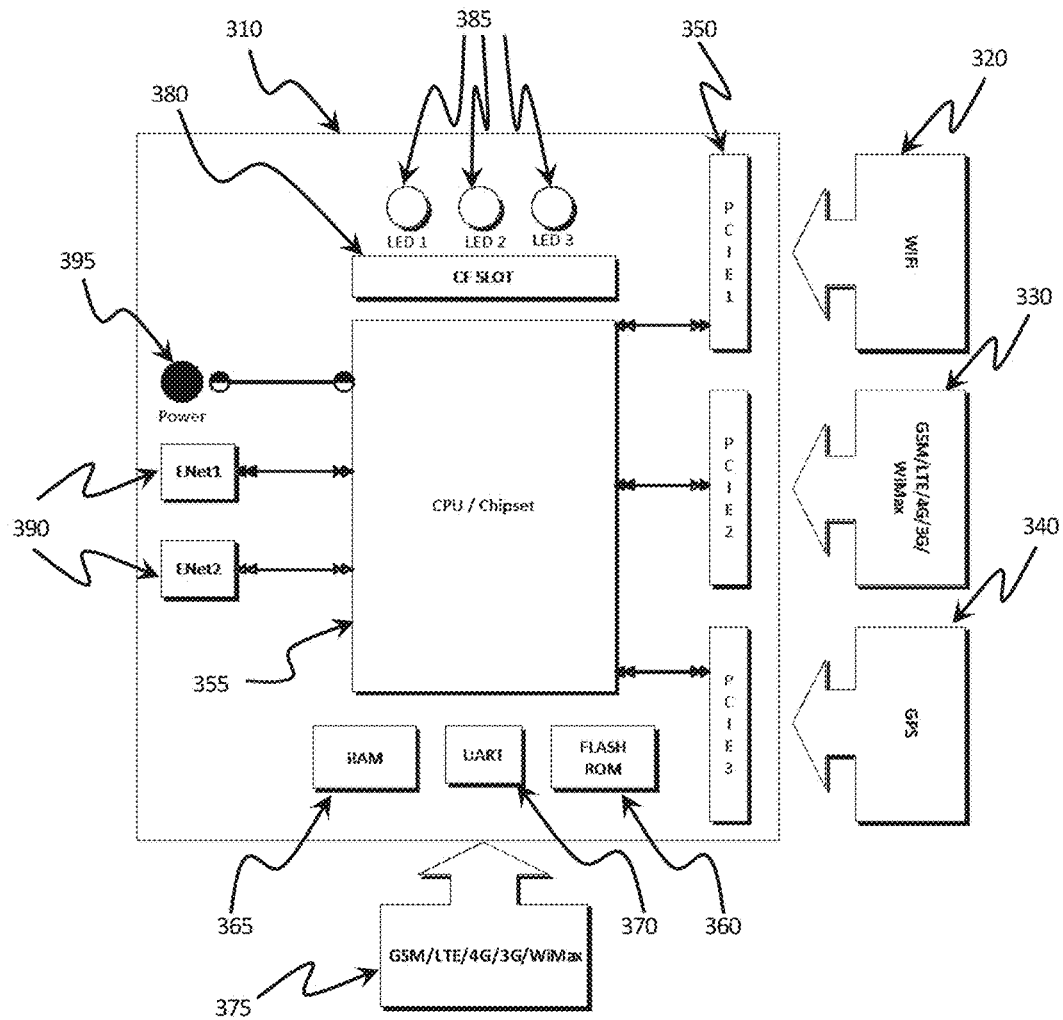
FIG. 3 depicts a block diagram of the control board mounted within the probe.

The components mounted on the internal control board include receivers for the various bands and interfaces to the CPU, a CPU mated with an appropriate controller chipset, ROM and RAM memory, a port for a standard flash memory device, monitor LEDs, network ports, and a power input point. FIG. 3 shows a typical configuration of the internal control board 310 in block diagram format. Three different reception systems are shown as providing inputs to the control board, representing Wi-Fi 320, cellular formats 330, and GPS 340, each communicating with the CPU and controller chipset through a PCIE interface 350.

The CPU 355 has memory mapping onto both FLASH ROM 360 and RAM memory 365 to provide for both permanently embedded programming and data and for storage of volatile data including both programs that are loaded internally or externally for temporary use and for data processed and stored by the probe for internal use or for reporting to the central console. A UART 370 for translation of data between forms recognized by the internal OS and CPU and external communications (including cellular devices) 375 devices is shown.

The block diagram also features a CF slot 380 for mounting of a standard compact flash memory stick. Other standard forms of memory such as SD can also be supported. The existence of miniature and sub-miniature SD cards (mini-SD and micro-SD) make it feasible to add as much memory as may be required for the OS, programs, and data required, and to facilitate easy updating of such data. Micro-SD cards of up to 128 GB storage capacity are readily available and those of a 16 GB capacity, which would typically be adequate for data and application storage in the probe, are available as a low-priced commodity, making even complex applications and those requiring rapid access to large amounts of data feasible within the small self-contained probe unit.

FIG. 3 for the internal control unit also shows a three-LED monitoring system that could consist of three discrete LEDs 385 or a one or more multi-color LEDs which may be lighted or flashed independently or in combinations to visually communicate operating status or events. A set of three LEDS or a single tri-color LED offers a multitude of possible signaling combinations using steady lighting, color changes, or flashing of one or more colors in different sequences or at different speeds. As noted above, use of binoculars or telescopes would allow the status of the probes to be monitored from a distance so long as the LEDs were in line-of-sight.

The block diagram in FIG. 3 features two data communication ports, identified as Ethernet ports 390, and a power input port 395 which could be connected to a an external DC power supply, battery, or other power source such as solar power. Recent advances in direct conversion photovoltaic technology and in storage battery technology, together with low power consumption of the most recent generation of control computing devices and radios make long-term uninterrupted operation feasible, particularly in light of the requirement to use the higher-power computing and radio transmission functions only at predetermined intervals or upon a triggering event.

Single board computers such as the miniature models of the Raspberry Pi and Arduino systems may provide the basic hardware for the probe. These single board computers are generally integrated with a number of standard interfaces and are plug-compatible with a wide variety of add-on devices. Both open source and commercial version of operating system and applications software are readily available for small single-board computers. Standard plug-compatible modules are offered for single-board computers to add different I/O modes and communication modes.

Figure 4:
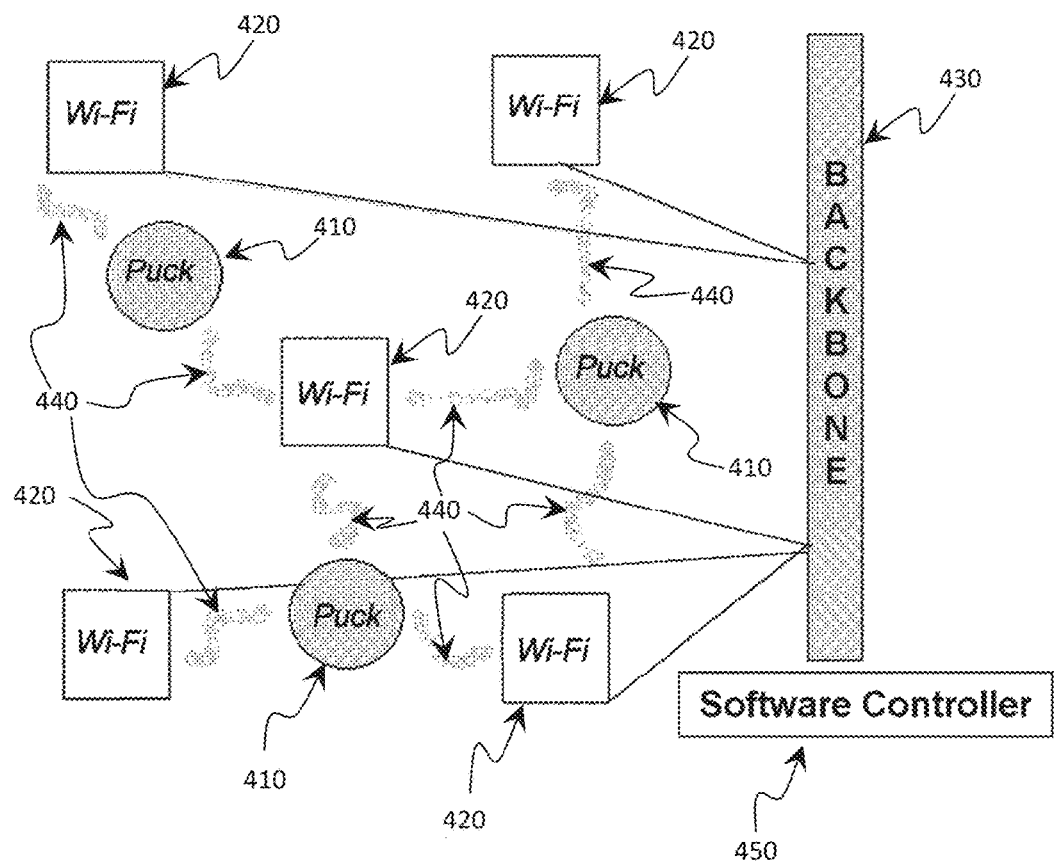
FIG. 4 depicts a networked array of multiple probes.

Multiple probes, each with the same functionality may be deployed interspersed geographically and/or topologically among multiple network nodes to monitor the functionality of the entire network or of multiple networks. FIG. 4 depicts a possible configuration where a set of three of the "puck"-type probes 410 are dispersed among a system of five Wi-Fi access points 420. Each of the Wi-Fi access points is connected to a common backbone 430. The probes, on the other hand, may each receive signals 440 from one or more of the access points that are within range, identifying the various access points by their addresses and other associated information. The probes can independently or collectively are awakened, report of the status of all signals being monitored and forward that information to the control console 450 for the probe system, which operates independent of the network backbone. Accordingly, the probe array or any element of the array can be activated and report the existence of disabled, weak, or compromised elements of the network.

Figure 5:
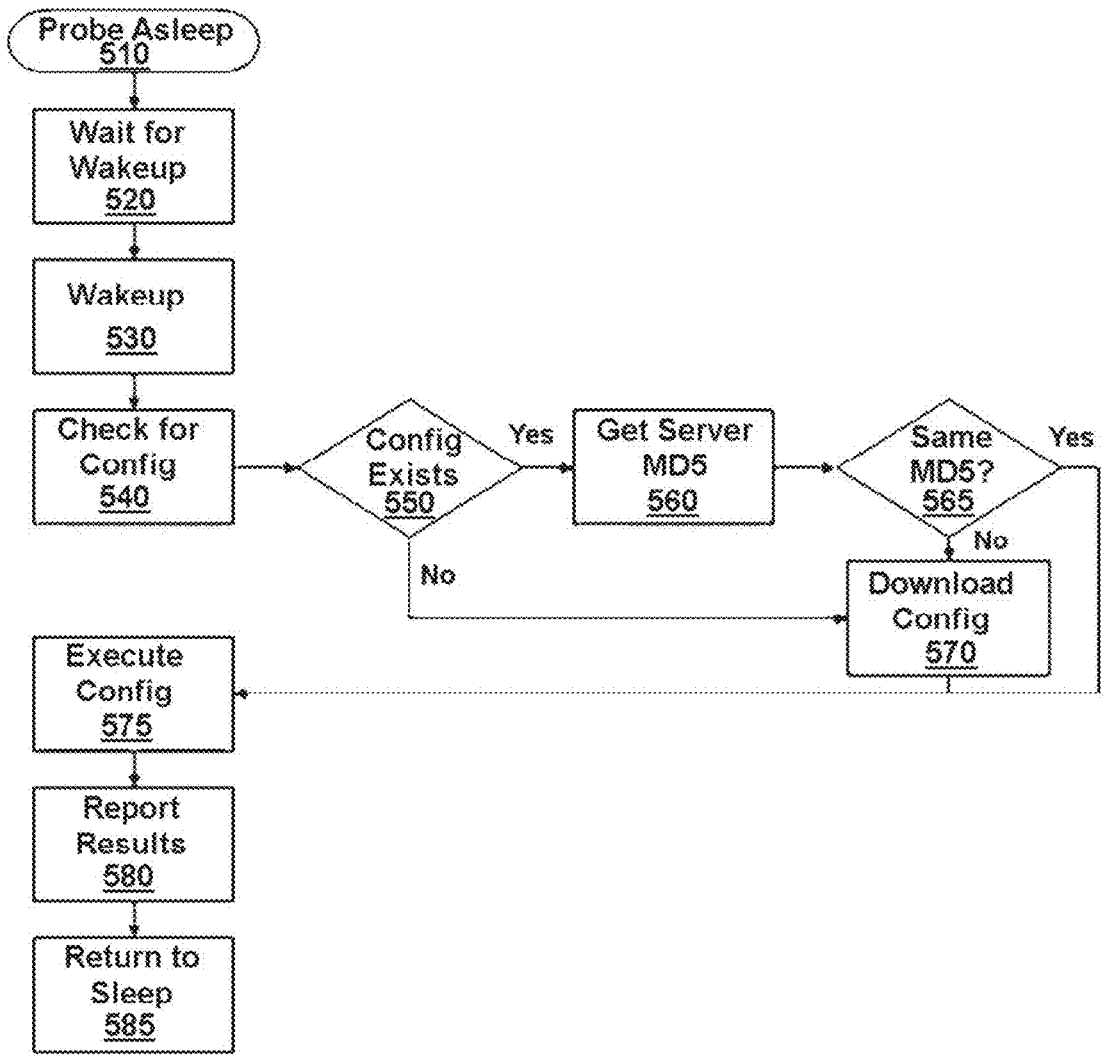
FIG. 5 depicts the process of awakening the probe and executing configuration parameters.

FIG. 5 depicts a flow chart of the probe's activation and reporting cycle. Each probe remains in a dormant or "asleep" state 510 until activated by a predetermined interval or trigger event. Upon activation 520, the probe performs predetermined tests or specific tests on commands received from the central monitor. These tests may involve a number of critical operating parameters, such as DHCP testing, DNS testing, IP reachability testing, bandwidth testing, SNMP testing, routing testing, or wireless coverage testing. The probes may seek out viewable access points from that location, and determine what communications channels are being used by those access points. The probes may conduct security testing, such as media sniffing for unsafe data sequences.

Upon entering the awake mode 530, the probes may test their own power status (including battery level, status, and charge), software version, and the MD5 checksum configuration. The probe first checks to ensure that it has an active configuration for the desired testing scenario 540. This may be done using the MD5 cryptographic hash function to determine the presence and validity of the configuration. If the configuration is present 550 it is tested against the matching MD5 checksum from the Server 560. If the checksum matches, the probe executes the checksum 575.

IF the MD5 checksum not present, the probe uses its communications capabilities to download 570 the designated configuration associated with the event that activated the probe from a dormant state, and executes 575 the configuration, comprising one or more tests. The results are then reported 580 for review and analysis using the console control applications. Upon completion of the configuration cycle, the probe returns to a dormant state 585.

The results of each specific test or question may be analyzed independently and combined with other data. The results may be graphed, flagged for ongoing tracking, recorded, and mapped using geographical coordinates specific to the probe being tested.

Figure 6:
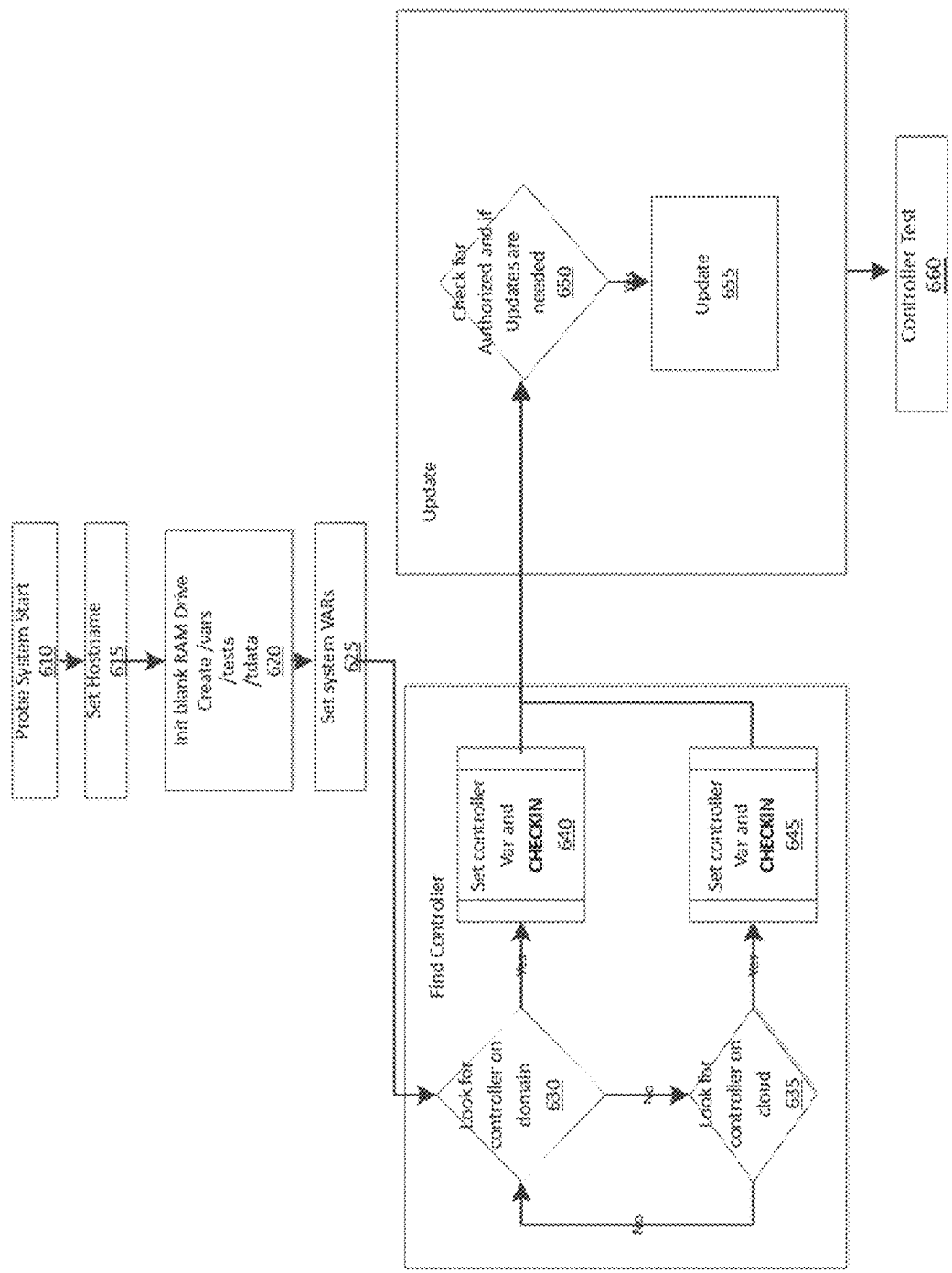
FIG. 6 depicts the process of initiating a probe testing session.

FIG. 6 depicts the process of initializing a probe for the purpose of conducting tests. The probe awakens and starts operation 610 upon the internal timer detecting the passage of a predetermined interval or upon the detection of a triggering event. Upon awakening the probe establishes a hostname 615, which may be a previously used identifier, or if none has been assigned a new identifier. The hostname identifier can be in the form of a UUID (universally unique identifier) which enables a distributed system, such as that comprised of a large number of probes connected via large scale enterprise networks or the internet, to uniquely identify the probe without significant central coordination.

In one embodiment, the probe initializes a blank RAM drive and creates three directories 620 for storage of variables (/vars), tests (/tests), and test data (/tdata) generated during the testing cycle. System variables 625 are initialized so that the controller managing the test cycle can see them once contact with the controller is made. Next, the probe finds the applicable controller by searching on the relevant domain 630. If the controller is not found on the domain (e.g. due to loss of connectivity), the probe looks for an applicable controller on the cloud 635. When the controller is found, either on the local domain or on the cloud-based system, the probe registers its identity with the controller and checks in with the domain-based controller 640 or the cloud-based controller 645, initializing the variables to the starting state in order to download the assigned test or set of tests. For example, the probe may identify itself as belonging to Company XYZ and then download the set of tests assigned based on Company XYZ's controller settings as stored either in the local domain controller or in the cloud-based controller.

The probe then does an authorization check 650 using the MD5 hashing scheme described above, determining first whether the controller is authorized and whether updates are required. If updates are required they are downloaded from the authorized controller 655. Once authorized and updated, the probe proceeds to the testing cycle.

Figure 7:
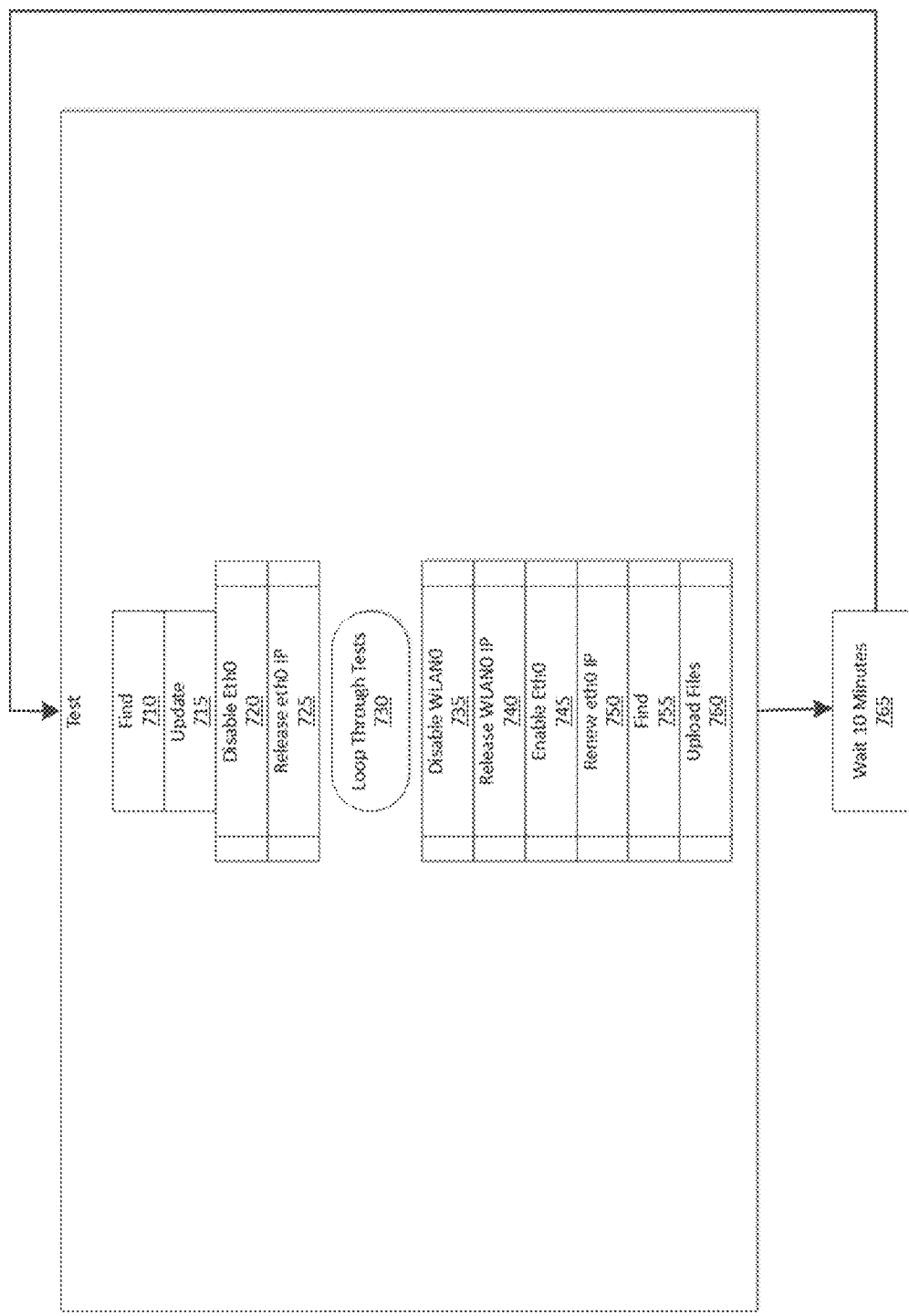
FIG. 7 depicts the process of performing test questions and mapping and recording associated data.
Figure 8:
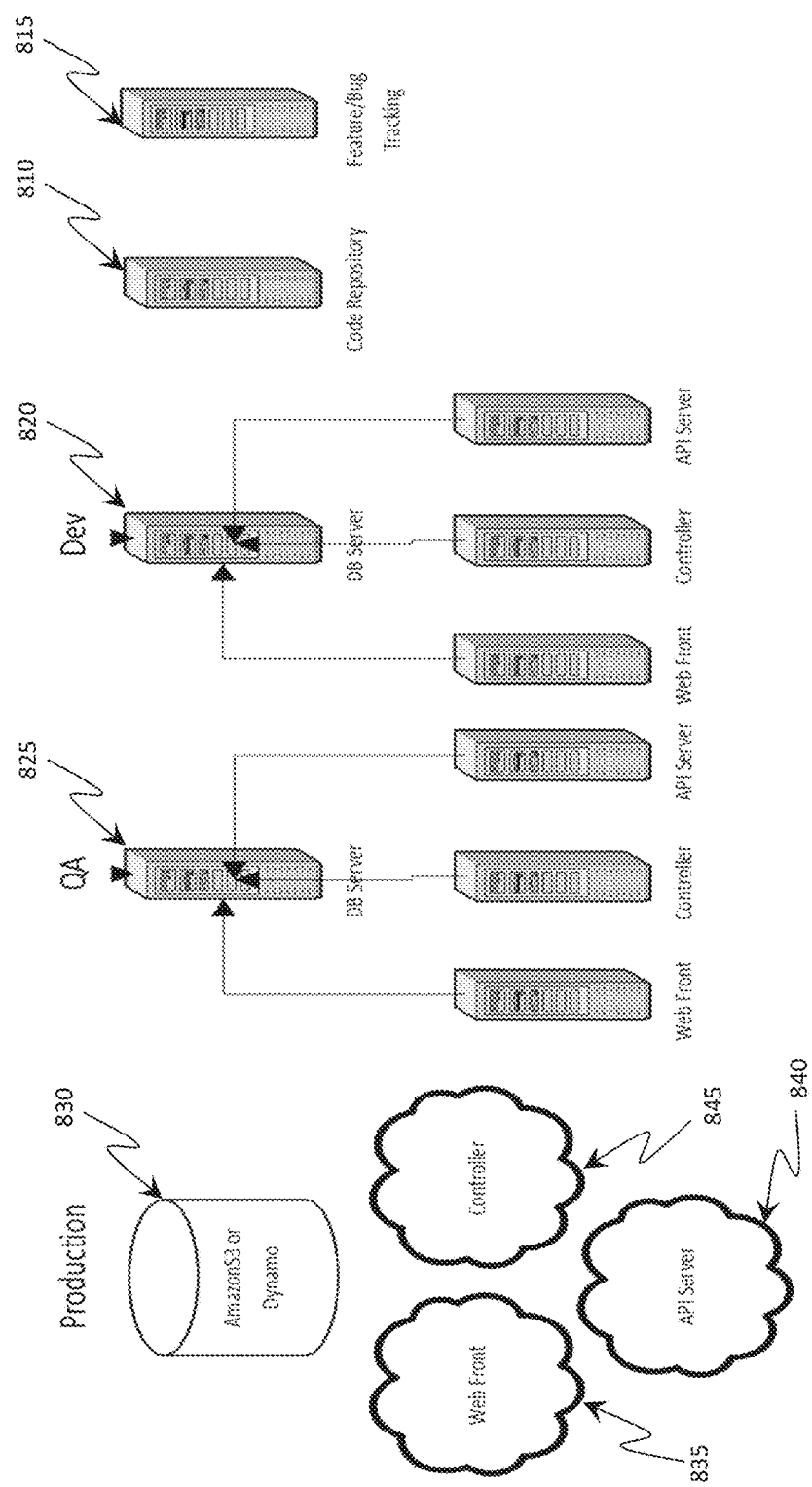
FIG. 8 depicts the development, quality assurance, and production environment of the system.

FIG. 7 depicts the testing cycle of a probe, which may be run as a continuous loop based on time intervals or triggering events. As described above, the probe finds the appropriate controller 710 and authorizes and updates the controller 715. In an example where the probe is connected to an Ethernet port, the probe disables the Ethernet port 720 and releases the Ethernet IP address 725. This allows the probe to start with a "blank slate" and avoid any confusion about pre-existing connectivity as the tests are conducted. The probe then conducts one or more tests as defined by the controller. Tests may include the verification and measurement of communications, including wireless communications as well as environmental factors, such as temperature or humidity, that may be read by the probe, either directly from sensors in the probe or from external devices with which the probe communicates.

As an example of the capabilities of the testing regime, a probe may be mounted on a mobile device such as a truck, in this example a refrigerated truck. The probe may awake at periodic intervals and, regardless of whether or not it is in communication with a network, can record and store data such as time, precise location from GPS coordinates, and the temperature as read from an internal thermometer or from a remote sensing device within the body of the truck. When the truck is in close proximity to a Wi-Fi network, the probe uploads the stored data to the controller for later examination or for the automated sending of notifications based on pre-determined alert conditions. In the example case, the recorded and uploaded data may verify compliance with applicable regulations relating to the transportation of perishable foodstuffs, or the failure of such compliance.

Upon completion of tests of wireless communications, a typical function for the probe, the probe would disable the wireless LAN connection 735 and release the wireless LAN port 735. A probe connected to a wired network via an Ethernet connection would then re-enable the Ethernet port 745, renew the Ethernet IP address 750, once again go through the find cycle 755 to locate the applicable controller as described above and, upon connecting with the controller, upload the files containing the test parameters and results 760. In a typical configuration, the probe would wait for a predetermined interval, ten minutes for example 765, and recommence the cycle. As the probe would be in operation for only fractions of a second during the ten minute cycle, reliability would be tested at intervals sufficiently small to quickly identify errors or outages, while ensuring long batter life if a local power source is not available.

The controller and testing software environment is required to deal with a rapidly changing technology base. Thus it is necessary to main a development and deployment system that is able to rapidly transition from a development environment, through a quality assurance program, and finally to production in a cloud-based environment. A code base repository 810 is maintained separate from the development testing environment for version tracking and other standard development management purposes, as is a feature and bug-tracking system 315. Code is developed for deployment in three functional areas: (1) the controller that manages the communications and testing; (2) a web front server that provides the interface to users accessing the system through web-enabled computing devices running operating systems that offer full-featured web browsers; and (3) an API server that manages interface through mobile devices.

A development environment 820 is maintained for parallel development of all three functional areas coupled to a central database server that emulates the ultimate production environment within a closed system. Prior to rolling out the controller and user access modules to full production a separate QA system 825 is maintained to allow stress testing of all system functions in an environment that also precisely emulates the ultimate cloud-based production environment. Upon achieving satisfactory quality assurance results, the production system is migrated so a cloud-based hosting system 830 such as that offered by Amazon S3, Dynamo, or other reliable SaaS hosted system providers. Within the cloud environment the web front for user access via browser 835, API server for mobile device access 840, and the controller system 845 operate as independent functions, which enhances scalability and reliability of the overall system.

The probes and management system allow management of telephony and data communications networks, helping ensure redundancy and reliability. The probes may be economically deployed in rural and urban areas, associated with various nodes and access points, to provide effective management of various different types of telecommunications networking systems.

The management console receives and stores information from the probes. Data is time stamped and associated with the specific probe and the specific network device or devices on which the probe is capable of reporting. The information is stored in a database, typically a relational database, comprised of tables appropriate to the mapping of the networks and probes being monitored. Using search, sort, and reporting functions—which may be coded in SQL for relational databases, or in other high-level search terms for translation into SQL or direct interaction with the database in use, analysis and reports are possible. Triggers and alerts may be set for any number of desired events, so that upon detection of an event, a message can be proactively sent via network messages, email, SMS text, fax, voice call, or other means to provide immediate notification to either devices of individuals that are capable of taking remedial action.

Functionality of the central controller includes, at a minimum, the following:
 Open Source Software
 Run on Windows-based computers (Linux is optional)
 Ability to configure the Probes
 Ability to monitor the Probes
 Standard Reporting Features
 GUI interface
 Upgradeability
 Ability to integrate with existing network control and monitoring systems.
 All variables are configurable and not hard-coded.

Figure 9:
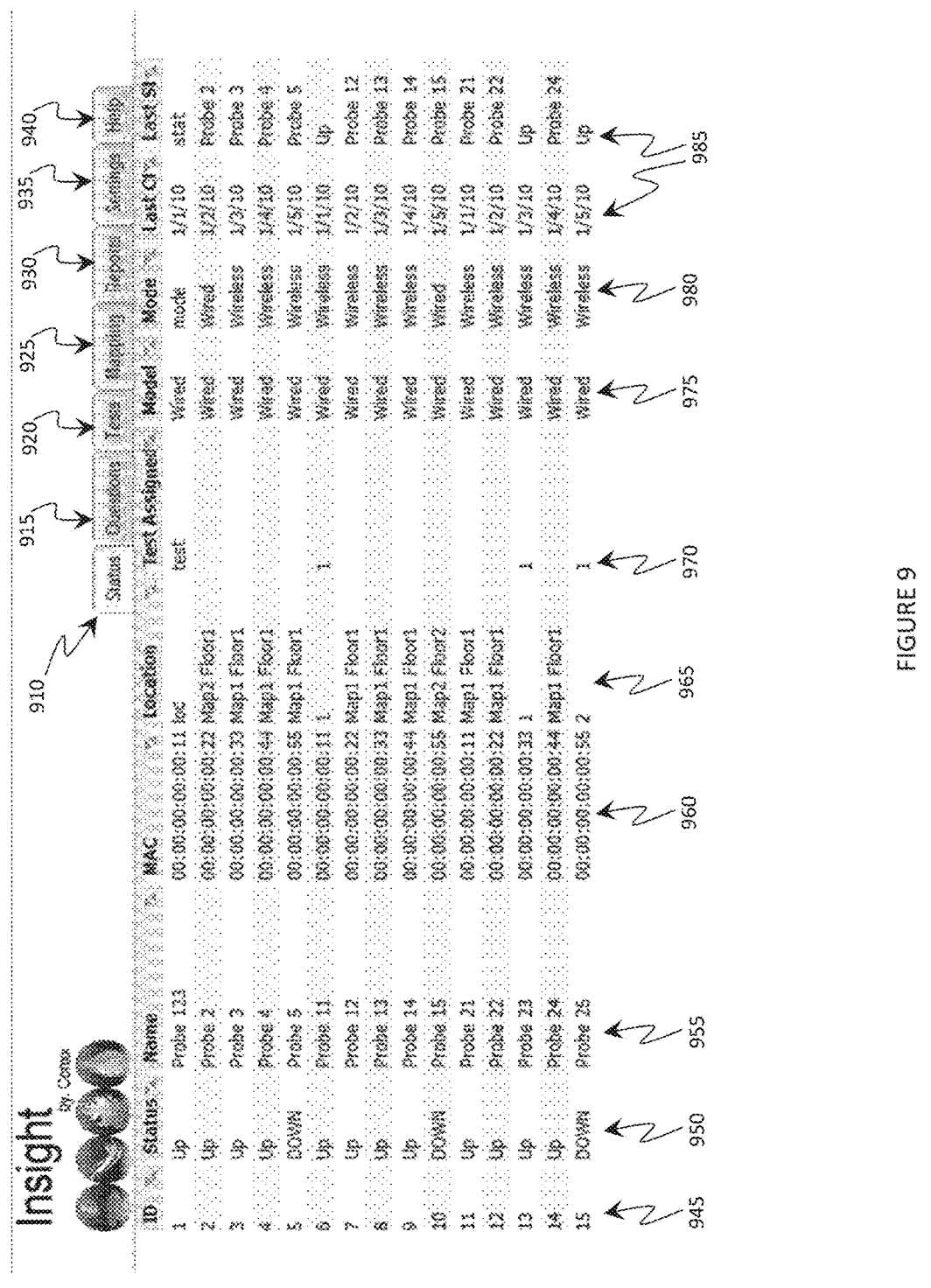

The GUI interface used to monitor the status of the probes can include any number of informational screens and can present the data in either text or graphics format, including maps, charts, and graphs. In the example screenshots below, the central monitoring software is designated as "Insight." The highest level menu depicted in FIG. 9 includes tabs for Status 910, Questions 915, Tests 920, Mapping 925, Reports 930, Settings 935, and Help 940. The most basic Status level information screen lists the probes by their ID number 945, status 950 (such as whether the individual probe is active or has exhibited an error conditions), name of the probe 955, address 960 (which may be the MAC address associated with the device), each probe's location 965, the assigned test configuration 970, the model type 995 (such as wired, wireless, or hybrid) and mode 980, and dates of last access and state 985.

Figure 10:
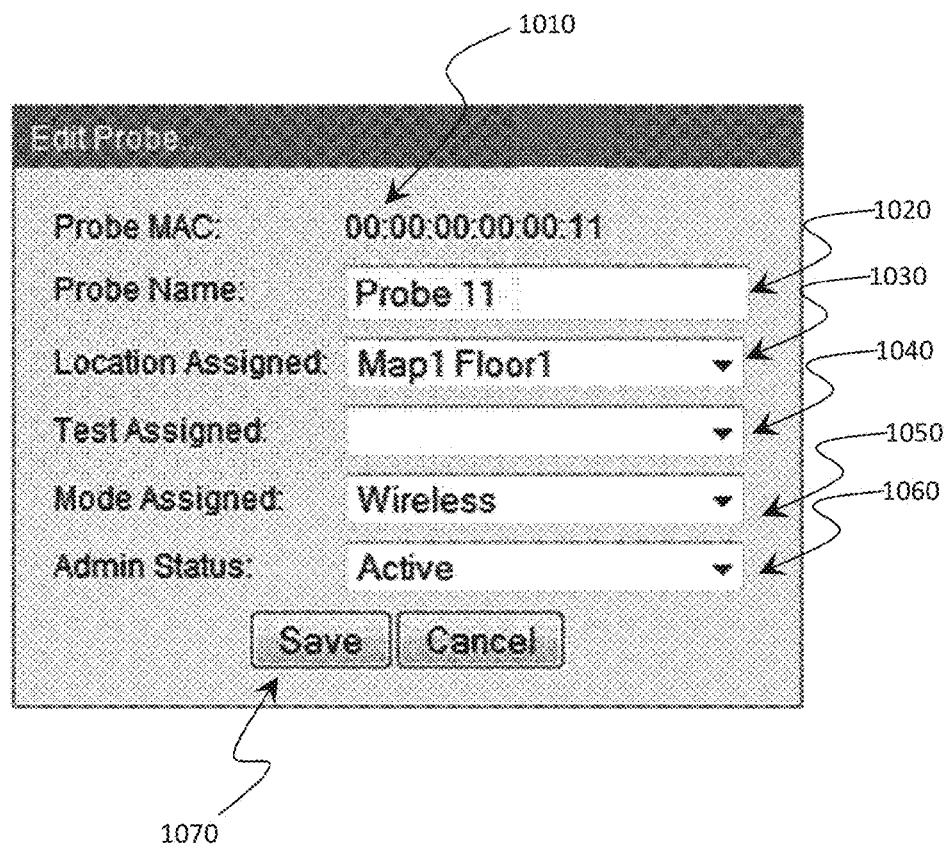
FIG. 10 depicts a configuration screen from the user interface.

From this basic screen, the configuration data associated with each probe can be read or modified. FIG. 10 depicts a configuration screen from the user interface in which an individual probe is identified by its MAC address 1010. The name assigned to the probe 1020 can be entered by the user using an arbitrary naming convention appropriate to the environment in which the probe is to be deployed. The location 1030, assigned test or test suite 1040, mode (e.g. wired or wireless) 1050, and active/inactive status 1060 may be selected from a pre-defined set of values using drop down menus. Once configured, the basic information for each probe may be saved 1070 for later retrieval and use in running tests.

Figure 11:
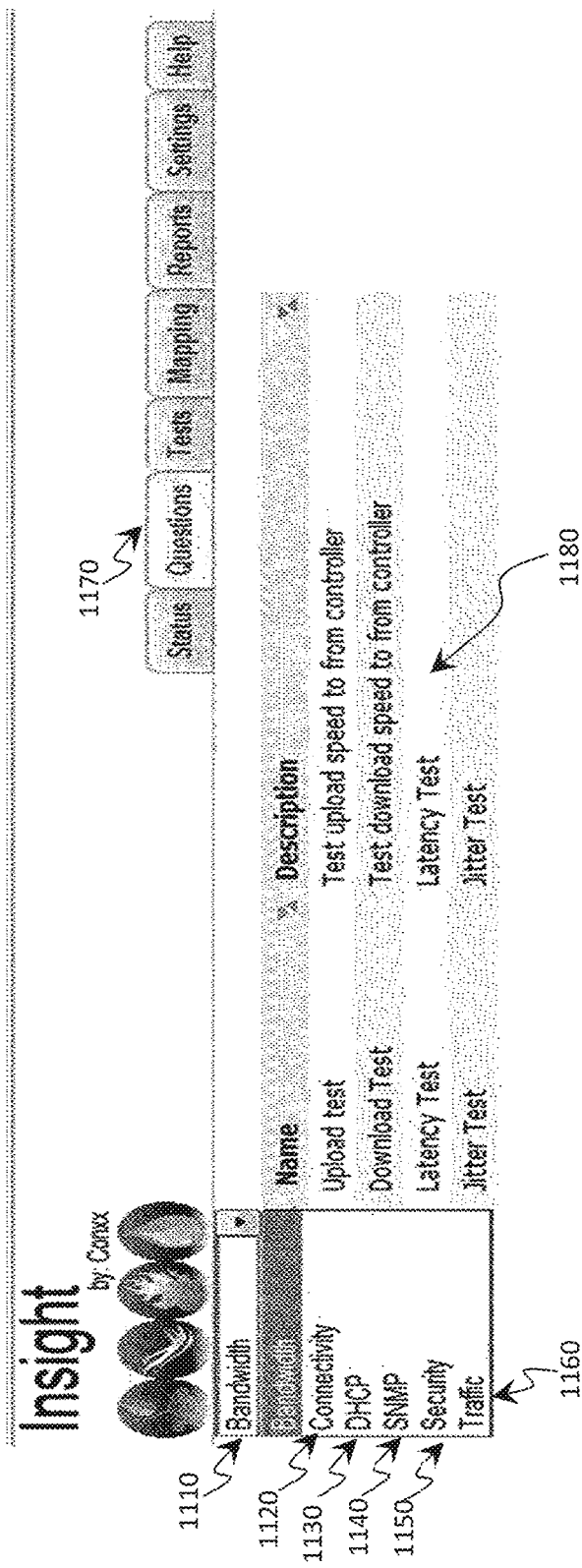
FIG. 11 depicts a menu for selection of various connectivity parameters to test.

FIG. 11 shows menu selection items for monitoring various aspects of the selected probe, this particular example including bandwidth (selected) 1110, connectivity 1120, DHCP 1130, SNMP 1140, Security 1150, and Traffic 1160. These functions are under the Questions Tab 1170 of the highest level menu. Associated with each item are the tests that can be run. For the Bandwidth selection, there are tests for Upload speed, Download Speed, Latency, and Jitter 1180. Tests may be run on an ad hoc basis or added to configuration files that run multiple tests on demand or at predetermined intervals or triggering events as described above.

Figure 12:
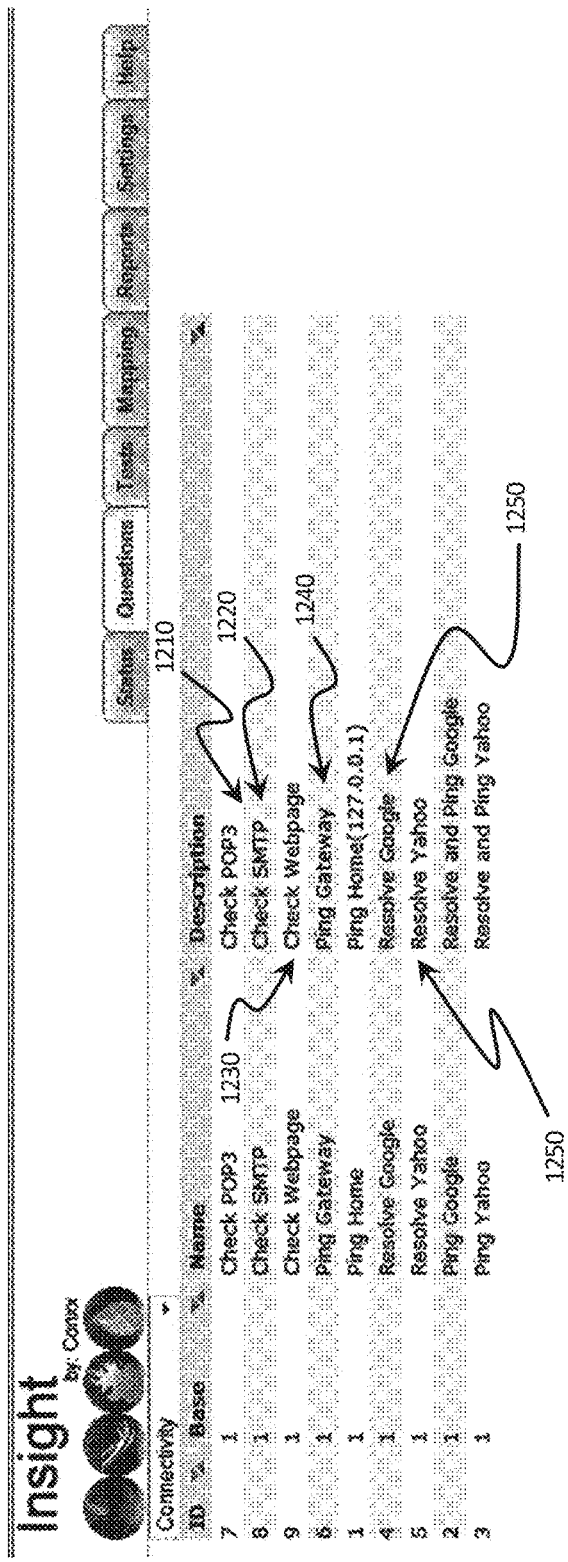
FIG. 12 depicts a suite of tests selected to test mail and web connectivity.

FIG. 12 is an example screen that shows additional details of test that can be performed to assure that all desired functions are working properly. The example shown, provides for the selection of tests for email (POP3 1210 and SMTP 1220), web page access 1230, ping 1240, and resolving and pinging major search engine addresses 1250 (Google and Yahoo in the example).

Additional tests test other network functions that are critical to network and internet connectivity, including the IP assignment of the node being checked, the net-mask being used, gateway address, and the primary and secondary DNS assignments used to resolve network names into IP addresses. Other menu items are provided for checking the Simple Network Management Protocol (SNMP) characteristics of the network, including access to the SNMP table that stores addresses, ports, and other network management information.

The central monitoring software also embodies sniffing functionality often used in network management, and comprising packet analysis functions for packets being sent and received over the subject network. Functions available to packet sniffers may include any or all of the following:
- Analyze network problems
- Detect network intrusion attempts
- Detect network misuse by internal and external users
- Documenting regulatory compliance through logging all perimeter and endpoint traffic
- Gain information for effecting a network intrusion
- Isolate exploited systems
- Monitor WAN bandwidth utilization
- Monitor network usage (including internal and external users and systems)
- Monitor data-in-motion
- Monitor WAN and endpoint security status
- Gather and report network statistics
- Filter suspect content from network traffic
- Serve as primary data source for day-to-day network monitoring and management
- Spy on other network users and collect sensitive information such as login details or users cookies (depending on any content encryption methods that may be in use)
- Reverse engineer proprietary protocols used over the network
- Debug client/server communications
- Debug network protocol implementations
- Verify adds, moves and changes
- Verify internal control system effectiveness (firewalls, access control, Web filter, Spam filter, proxy)

Figure 13:
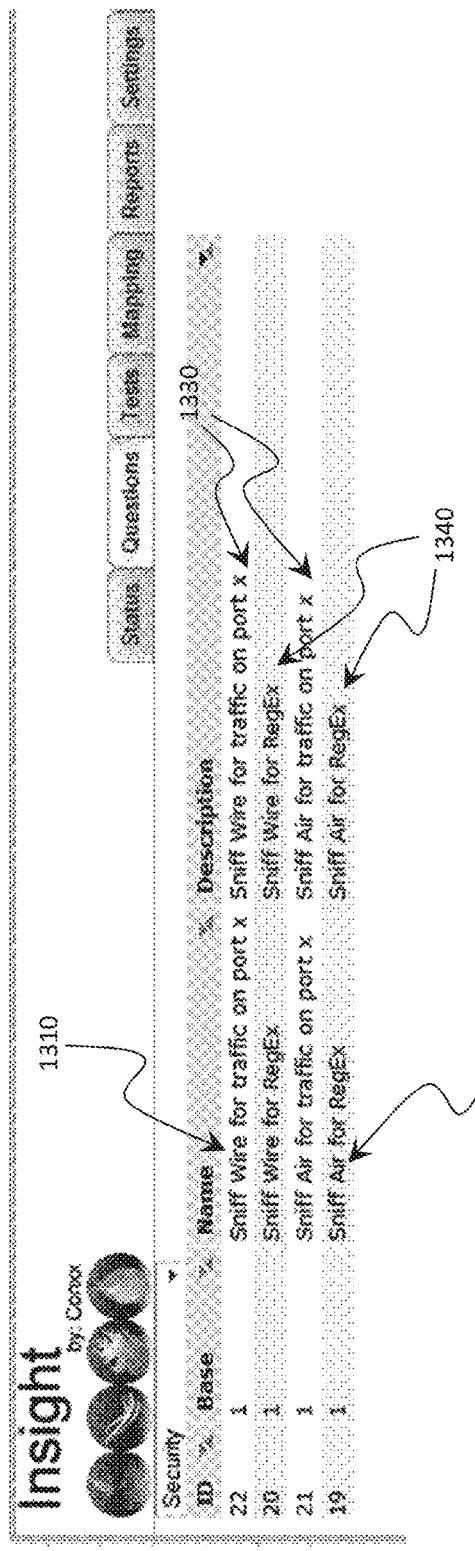

FIG. 13 depicts a screenshot featuring menu selections for predetermined packet analysis or "sniffing" functions for both wired 1310 and wireless ("air") 1320 elements of the network analyzed by the probe(s). Notably, this includes the traffic passed through the network node on a predetermined port x 1330 and for RegEx analysis 1340, which can parse and analyze RegEx "Regular Expressions" used in network communication.

The central monitoring console can integrate with standards that are embodied in network hardware devices including access sFlow standard tools as promulgated in by the sFlow consortium and supported by multiple hardware manufacturers. The sFlow system uses random and time based sampling to monitor high speed networks where full real-time sampling is impractical. The nFlow or NetFlow system is used by Cisco which is the most dominant single provider of network appliances. This functionality also includes options to monitor inbound and outbound traffic associated with designated ports.

Figure 14:
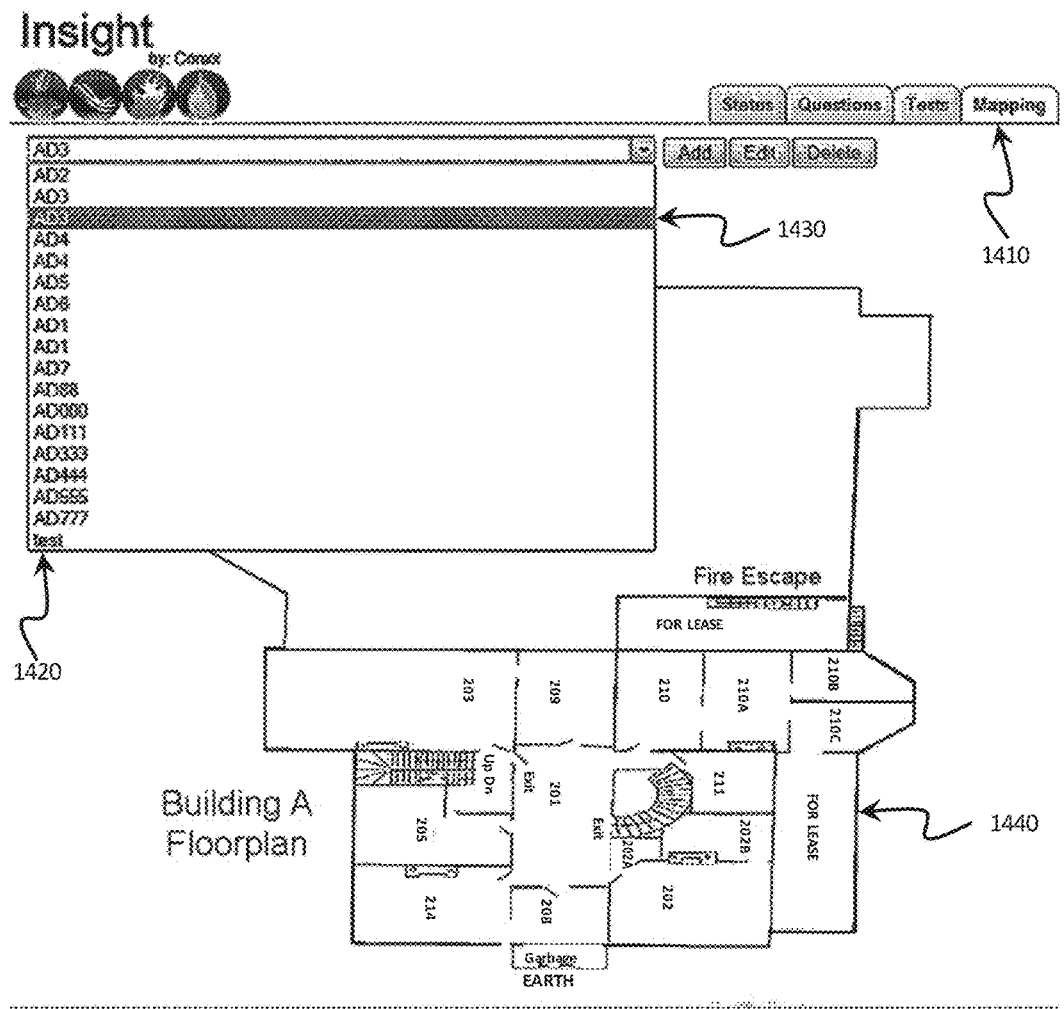
FIG. 14 depicts a mapping function showing the physical location of probes in a building floor plan.

The console also allows geographical as well as topological representation of networks to be monitored visa a mapping tab 1410 on the master console. Maps or floor plans can be imported into or generated within the console system. Remediation of network problems detected by probes can be instituted by directing the service technicians to the exact location of the network device in need of service. FIG. 14 depicts sample of a floor plan map that might be associated with a business network with multiple access points. A drop down menu 1410 provides for graphic mapping of the location of any specific network device using its associated ID 1420, highlighting a specific probe 1430 from the list and displaying its location on a floor plan or map 1440.

The ability of the probes to be remotely accessed and activated from a dormant state also enables monitoring of mobile facilities. Autonomous probes may be installed on vehicles, vessels, and mobile assets such as trailers, containers, and equipment. Time based or remote activation allows the assets to be tracked and their coordinates plotted in relation to geography, network topology, cellular tower locations or other fixed or mobile network devices with monitoring capability. The autonomous probe would receive a GPS signal, computer coordinates and telemetry, and report position, telemetry, and time over the associated network. Such reports could be used to map the movements of mobile assets and well as providing triggers and alerts according to predetermined events or criteria.

Thus, the present system and apparatus provide several advantages over the prior art. Although embodiments of the present invention have been described, various modifications and modifications and changes may be made by those skilled in the art without departing from the spirit and scope of the system and apparatus.

The invention claimed is:

1. A network management apparatus comprising:
at least one autonomous probe configured to emulate end user activity on a network, and to employ the emulated end user activity for monitoring, testing, measuring, and evaluating the quality, connectivity, utilization, and security of a communications network, each probe being installed at a separate unique physical location, each probe being configured for performing the following series of operations:
awakening from a dormant state at a predetermined time interval;
identifying at least one predetermined controller;
initiating a communication session with the identified controller, the communication session being initiated by the probe;
determining whether a task list has been assigned to the awakened probe and, if a task list has been assigned, executing the tasks on the task list, and if a task list has not been assigned, taking no action until the probe detects that a task list has been assigned;
communicating the results of executing the task list to a probe data collection controller; and returning to a dormant state;
each probe being assigned at least one task, and each probe physically comprising:
a housing;
a power source;
at least one programmable probe status indicator; and
a programmable central processing unit and associated memory contained within the housing;
each probe being further enabled for:
autonomous activation and deactivation;
remote activation and remote deactivation;
remote mode assignment for wired and wireless enabled devices;
remote test assignment;
communication with a network; and
identifying and establishing a communication session with at least one predetermined local controller;
at least one local probe controller in networked communication with the at least one probe, the controller having at least one test that can be assigned to at least one autonomous probe, the controller comprising a central processing unit ("CPU"), a centralized data store, a report generator, a probe manager module, the probe data collection module, and a user interface, wherein:
the user interface is configured for assembling a predetermined number of tasks into a task list;
the probe manager module is configured for assigning and communicating the task list to the at least one probe;
the probe data collection module is configured for receiving the results of executing the task list from the at least one probe; and
the report generator is configured for compiling the results of executing the task list into a plurality of predetermined reports, triggers, and alerts.

2. The apparatus of claim 1 further comprising a global director to assist in identifying the predetermined controller by receiving a communication from an awakened probe, identifying the awakened probe, accessing a global data base, associating the awakened probe with the predetermined controller, and communicating the identity of the predetermined controller to the probe.

3. The apparatus of claim 1 wherein the probe is further configured to identify the predetermined controller by preappending a known identifier to a Dynamic Host Configuration Protocol ("DHCP") defined domain name.

4. The apparatus of claim 1 wherein the task list is created with a user experience scripting language that comprises a human-readable grammar having nouns and action verbs that translate into functions and variables for compilation into the task list to be forwarded to and executed by the awakened probe.

5. The apparatus of claim 1 wherein the probe is configured to execute a task list that emulates a human end user in a predetermined communication environment to permit the probe report generator to report user experience quality level.

6. The apparatus of claim 1 wherein the probe is configured to communicate to the controller at least one of the following parameters:
Dynamic Host Configuration Protocol ("DHCP") testing;
Domain Name System ("DNS") testing;
Internet protocol ("IP") reachability testing;
bandwidth testing;
Simple Network Management Protocol ("SNMP") testing;
route testing;
wireless coverage testing;
viewable access points and communications channels being employed by each access point;
security testing including media sniffing for unsafe data sequences;
probe power status;
battery level, status, and charge;
probe software version;
probe MD5 algorithm checksum configuration;
probe online configuration; and
probe Global Positioning System ("GPS") information.

7. The apparatus of claim 1 in which the power source comprises at least one of:
a solar-powered battery source;
a power-over-Ethernet power source;
a land-based alternating or direct current power source;
a self-contained battery; and
a locally generated source.

8. The apparatus of claim 1 in which each probe includes at least one of:
an Ethernet port;
an external antenna port;
a serial port and or a Universal Serial Bus ("USB") port;
a wireless transceiver and antenna;
a Global Positioning System ("GPS") receiver;
a Modbus protocol port;
a cellular radio; and
a wireless receiver.

9. An autonomous probe configured to emulate end user activity on a network, and to employ the emulated end user activity, the probe electronically connectable to a communications network for performing at least one of the network management functions of monitoring, testing, measuring, and evaluating at least one of the quality, connectivity, utilization, and security of the communications network, the probe being configured for performing at least one of the following operations:
awakening from a dormant state at a predetermined time interval;
identifying at least one predetermined controller;
initiating a communication session with an identified controller;
determining whether a task list has been assigned to the awakened probe and, if a task list has been assigned, executing a task on the task list, and if a task list has not been assigned, taking no action until the probe detects that a task list has been assigned;
communicating the results of executing a task from the task list to a probe data collection controller; and
returning to a dormant state;
the probe comprising:
a housing;
a power source;
at least one programmable probe status indicator; and
a programmable central processing unit and associated memory contained within the housing;
the probe being further enabled for at least one of:
autonomous activation and deactivation;
remote activation and remote deactivation;
remote mode assignment for wired and wireless enabled devices;
remote test assignment;
communication with a network; and
identifying and establishing a communication session with at least one predetermined local controller.

10. The autonomous probe of claim 9 wherein the probe is configured to identify a predetermined controller by pre-appending a known identifier to a Dynamic Host Configuration Protocol ("DHCP") defined domain name.

11. The autonomous probe of claim 9 wherein the task list is created with a user experience scripting language that comprises a human-readable grammar having nouns and action verbs that translate into functions and variables for compilation into the task list to be forwarded to and executed by the awakened probe.

12. The autonomous probe of claim 9 wherein the probe is configured to execute a task list that emulates a human end user in a predetermined communication environment to permit the probe report generator to report user experience quality level.

13. The autonomous probe of claim 9 wherein the probe is configured to communicate to a probe controller at least one of the following parameters:
   Dynamic Host Configuration Protocol ("DHCP") testing;
   Domain Name System ("DNS") testing;
   Internet protocol ("IP") reachability testing;
   bandwidth testing;
   Simple Network Management Protocol ("SNMP") testing;
   route testing;
   wireless coverage testing;
   viewable access points and communications channels being employed by each access point;
   security testing including media sniffing for unsafe data sequences;
   probe power status;
   battery level, status, and charge;
   probe software version;
   probe MD5 algorithm checksum configuration;
   probe online configuration; and
   probe Global Positioning System ("GPS") information.

14. The autonomous probe of claim 9 in which the power source comprises at least one of:
   a solar-powered battery source;
   a power-over-Ethernet power source;
   a land-based alternating or direct current power source;
   a self-contained battery; and
   a locally generated source.

15. The autonomous probe of claim 9 in which the probe comprises at least one of:
   an Ethernet port;
   an external antenna port;
   a serial port and or a Universal Serial Bus ("USB") port;
   a wireless transceiver and antenna;
   a Global Positioning System ("GPS") receiver;
   a Modbus protocol port;
   a cellular radio; and
   a wireless receiver.

16. A probe controller electronically connectable to a communications network, the controller comprising a central processing unit ("CPU"), a centralized data store, a report generator, a probe manager module, a probe data collection module, and a user interface, the controller having at least one end user emulation test that can be assigned to an autonomous probe.

17. The controller of claim 16 further comprising a user interface configured for assembling a predetermined number of end user emulation tasks into a task list.

18. The controller of claim 16 wherein the probe manager module is configured for assigning and communicating an end user emulation task list to an autonomous probe.

19. The controller of claim 16 wherein the probe data collection module is configured for receiving the results of executing an end user emulation task list from an autonomous probe.

20. The controller of claim 16 wherein the report generator is configured for compiling the results of executing an end user emulation task list into at least one of predetermined reports, triggers, and alerts.

* * * * *